US007492485B2

(12) United States Patent
Ramesh et al.

(10) Patent No.: US 7,492,485 B2
(45) Date of Patent: Feb. 17, 2009

(54) IMAGE-BASED COMPENSATION AND CONTROL OF PHOTORECEPTOR GHOSTING DEFECT

(75) Inventors: Palghat S. Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 596 days.

(21) Appl. No.: 11/253,724

(22) Filed: Oct. 20, 2005

(65) Prior Publication Data

US 2007/0092274 A1 Apr. 26, 2007

(51) Int. Cl.
*G06T 5/00* (2006.01)
*H04N 1/38* (2006.01)
*G06K 9/40* (2006.01)

(52) U.S. Cl. .................... 358/3.26; 358/3.27; 358/463; 382/275

(58) Field of Classification Search ................ 358/3.26, 358/3.27, 463; 399/49; 382/275
See application file for complete search history.

(56) References Cited

U.S. PATENT DOCUMENTS

| | | | | |
|---|---|---|---|---|
| 6,496,604 | B1 * | 12/2002 | Bricourt | 382/254 |
| 7,292,798 | B2 * | 11/2007 | Furukawa et al. | 399/49 |
| 2003/0228177 | A1 * | 12/2003 | Hirsch | 399/265 |
| 2006/0077489 | A1 * | 4/2006 | Zhang et al. | 358/504 |

* cited by examiner

*Primary Examiner*—King Y Poon
*Assistant Examiner*—Javier Segura
(74) *Attorney, Agent, or Firm*—Oliff & Berridge, PLC

(57) ABSTRACT

A system and method for correcting a defect in an image, such as a ghost defect or a reload defect, by compensating for the defect. A defect model is created with a source target function that represents a source level with respect to a target level. A test output image is created on which the test data is measured. State data representing a state of the imaging device, previously printed images or the current image are inputted to a controller. An image correction factor is outputted from the controller based on the test image measurement data, the state data, the previously printed images, and the current image to the image path actuator. A corrected image is created based on the image correction factor.

19 Claims, 8 Drawing Sheets

IMAGE-BASED COMPENSATION AND CONTROL OF PHOTORECEPTOR GHOSTING DEFECT

BACKGROUND

This application relates generally to systems and methods for compensating for image defects in imaging systems, particularly photoreceptor ghosting image defects in xerographic imaging systems.

Photoreceptor ghosting is a problem that plagues many xerographic printing systems. Generally, ghosting is caused by charges trapped in a photoreceptor during an imaging cycle that occurs prior to a present imaging cycle. Typically, the charges trapped in the photoreceptor are holes. Also typically, this problem occurs during exposure or transfer. Erase can also play an important role. Typically, the trapped charges (holes) are released during a subsequent imaging cycle. This release of charges (holes) trapped in the photoreceptor during a prior imaging cycle creates a ghost of the previous image on a subsequent image.

Thus, a ghost defect has a functional relationship to the image captured by the photoreceptor during a previous imaging cycle. A ghost defect is also dependent on a state of the photoreceptor. An example of a state of the photoreceptor that affects a ghost defect is the age of the photoreceptor. A new photoreceptor and an old photoreceptor will not typically evidence an identical ghost defect given the same prior image.

Several variables affecting the configurations of a xerographic printing device also affect the appearance of a ghost defect. For example, the charging level of the device, the exposure level of the device, the transfer set points of the device, and so on, all have an impact on the appearance of a ghost defect in an image created by the device.

A ghost defect typically occurs at a spatial distance from the original image giving rise to the ghost defect equal to the circumference of the photoreceptor. This spatial distance corresponds to the rotation of the photoreceptor. When the photoreceptor rotates exactly one rotation, any residual charge of the previous image on the photoreceptor results in a ghost defect on the current image created by the photoreceptor.

Although the degradation of a ghost defect in the photoreceptor charge is fairly rapid, such defects can exist in an image produced some multiple of revolutions of the photoreceptor other than one. In other words, a ghost defect could appear at a spatial distance equivalent to twice the circumference of the photoreceptor from the image giving rise to the ghost. The typical spatial distance of one revolution of the photoreceptor or one times the circumference of the photoreceptor is also referred to at times as the ghost distance.

Ghost defects are unwanted imperfections in an image created by the device. Thus, ghost defects can be extremely objectionable to the user of a xerographic system. It is believed that ghosting defects are a critical problem for both belt photoreceptors and drum photoreceptors. There is not any known method or system for eliminating or controlling ghost defects that is able to eliminate or control ghost defects in a robust manner.

There are two forms of a ghost defect. A negative ghost defect exists where the ghost image is lighter than the surrounding image. A positive ghost defect exists where the ghost image is darker than the surrounding image.

It is believed that a root cause of ghost defects is associated with defects in the structure of a photoreceptor. Nevertheless, the appearance of a ghost defect is often triggered by an interaction between the photoreceptor and the xerographic imaging process.

In some instances, regions where charges are trapped on the photoreceptor and then released in creating a ghost image are charged higher (more positive) with respect to the normal surrounding regions. In exposure induced ghosting, the trapped charges are created in an image-wise fashion. In transfer induced ghost defects, the trapped charges are created in an anti-image-wise fashion. Thus, the result of the release of the trapped charges is either a positive or a negative ghost of the previous image. The ghost image is typically observed in halftone areas where the difference in the charge between the trapped charges and the surrounding normal region is evidenced as either a growth or attrition of the halftone dots.

When there is an attrition of the halftone dots, the halftone dots are smaller than the halftone dots in the surrounding image region. This corresponds to a negative ghost image. When the difference in the charge results in a growth of the halftone dots, the halftone dots in the area of the ghost defect are larger than the halftone dots in the surrounding normal image region. This corresponds to a positive ghost image.

It is believed to be likely that certain photoreceptors are predisposed to exhibiting ghost defects. However, despite this predisposition in certain photoreceptors, the presence or absence of ghost defects in images created by a given photoreceptor may evidence themselves and then disappear periodically over the life of the photoreceptor.

SUMMARY

In various exemplary embodiments, an image-based compensation method is applied to control or eliminate a photoreceptor ghosting defect in an image.

In various exemplary embodiments, an inline full width array (FWA) sensor is used to build a printer ghost defect model.

In various exemplary embodiments, an offline scanner is used to build a printer ghost defect model.

In various exemplary embodiments, an inline full width array sensor is used to build an engine response curve (ERC) model for each color separation.

In various exemplary embodiments, an offline scanner is used to build an engine response curve model for each color separation.

In various exemplary embodiments, an image buffer is used to store a ghost source image.

In various exemplary embodiments, a ghost source image stored in an image buffer consists of one photoreceptor revolution's worth of the previous image.

In various exemplary embodiments, a ghost source image stored in an image buffer consists of more than one photoreceptor revolution's worth of the previous image.

In various exemplary embodiments, a ghost source image stored in an image buffer is continuously refreshed.

In various exemplary embodiments, a compensation algorithm uses a printer ghost model.

In various exemplary embodiments, a compensation algorithm uses an engine response curve model.

In various exemplary embodiments, a compensation algorithm uses a ghost source level.

In various exemplary embodiments, a compensation algorithm uses one or more of a printer ghost model, an engine response curve model, and a ghost source level, to correct continuous tone (contone) levels of an image.

In various exemplary embodiments, compensation algorithms comprising the engine response curve and ghost defect model are constructed for multiple regions on the photoreceptor surface to account for inboard to outboard variations and other photoreceptor signatures.

In various exemplary embodiments, a printer ghost model is periodically updated.

In various exemplary embodiments, an engine response curve model is periodically updated.

In various exemplary embodiments, one or both of a printer ghost model and an engine response curve model are periodically updated to account for changes in the state of a photoreceptor such as the age of the photoreceptor, deterioration of the photoreceptor over time, reduction in the thickness of the photoreceptor over time, and the buildup of a film on the photoreceptor over time.

In various exemplary embodiments, one or both of a printer ghost model and an engine response curve model are periodically updated to account for changes in a material state of a toner such as the age of the toner, the concentration of the toner, or the adhesion properties of the toner.

In various exemplary embodiments, a tone reproduction curve image path actuator is used to compensate for the ghost defect.

In various exemplary embodiments, a dynamic halftone thresholds image path actuator is used to compensate for the ghost defect.

BRIEF DESCRIPTION OF THE DRAWINGS

Various exemplary embodiments of this invention will be described in detail, with reference to the following figures, wherein.

DETAILED DESCRIPTION OF EMBODIMENTS

In an exemplary embodiment of a method for compensating and controlling a ghosting defect of a photoreceptor, the first step is to create a model for the ghost defect. A printer ghost defect model is a prediction of what the ghost defect is expected to be. In various exemplary embodiments, a model for a ghost defect is recreated periodically. In various exemplary embodiments, the length of the period after which a model for a ghost defect is recreated is determined based on the magnitude of the ghost defect observed in the system. Thus, in various exemplary embodiments, the length of a period after which a model for a ghost defect is recreated changes in association with changes of the state of the entire system.

An engine response curve model is also created. The engine response curve model predicts the effect that the implementation of the ghost defect model will have on the actual output of the system.

Figure 1:
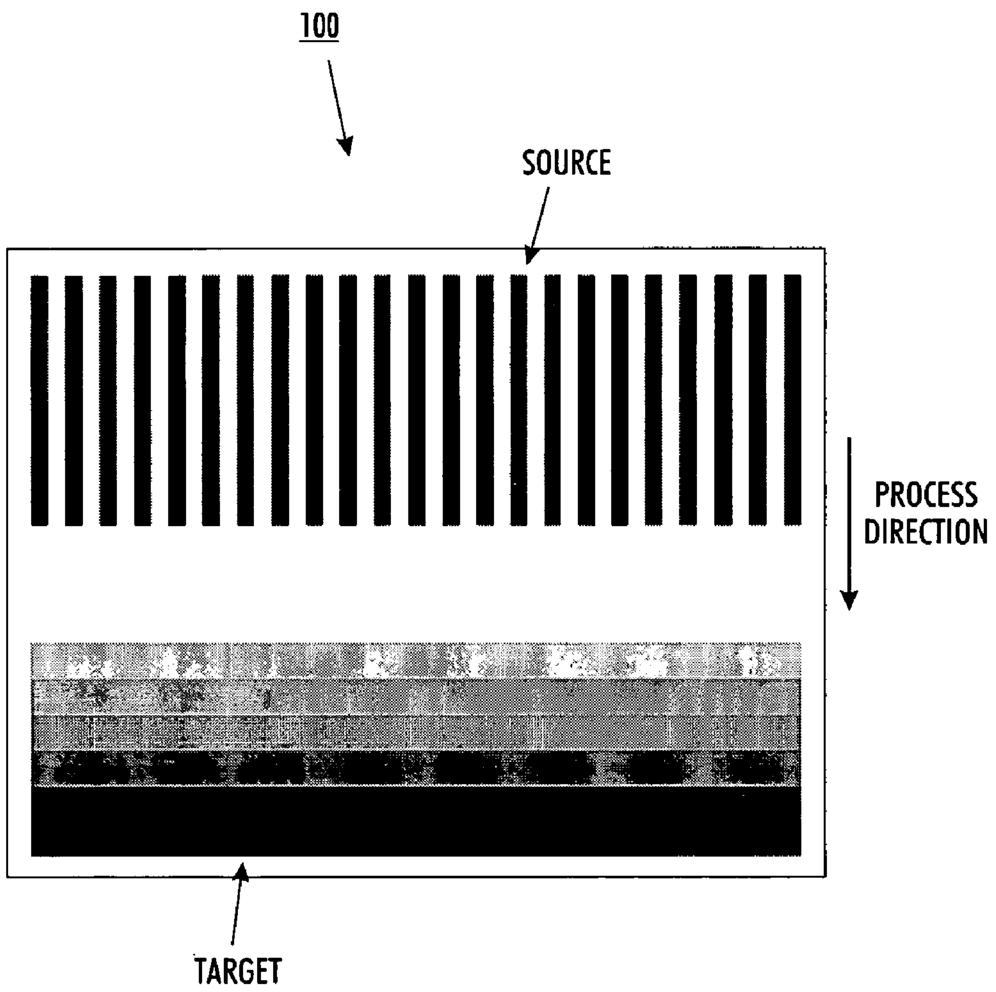
FIG. 1 is a diagram of an exemplary test pattern used for creating a ghost defect model.

FIG. 1 is a diagram of an exemplary test pattern 100 used for creating a ghost defect model. In various exemplary embodiments, the exemplary test pattern 100 is printed and the resulting printed test pattern is used to create the ghost defect model. The exemplary test pattern 100 is a test pattern having a source area coverage (SAC) of 100 percent. In various exemplary embodiments, similar test patterns are used corresponding to a source area coverage less than 100 percent.

In various exemplary embodiments, source samples are used in creating an exemplary test pattern that are lighter than the source samples depicted in exemplary test pattern 100. In various exemplary embodiments, source samples are used that are darker than the source samples depicted in exemplary test pattern 100. Thus, in one exemplary embodiment, an exemplary test pattern is used that contains a large matrix including all possible source sample levels. Exemplary test pattern 100 depicts one source sample level.

In various exemplary embodiments, the ghost image of the source appears in the target image. In various exemplary embodiments, the magnitude of a ghost defect in an image is measured as a difference in the gray level between the normal area of the image and the ghost area of the image. In exemplary test pattern 100, the normal area of the target corresponds to the white bars in the source region. In exemplary test pattern 100, the ghost area is the portion of the target corresponding to the black bars of the source. The ghost image will be evident by comparing the ghost areas to the normal areas of the target.

In various exemplary embodiments, an inline sensor such as a full width array is used to measure the magnitude of a ghost defect. In various exemplary embodiments, an offline measurement device such as a scanner is used to measure the magnitude of a ghost defect.

Figure 2:
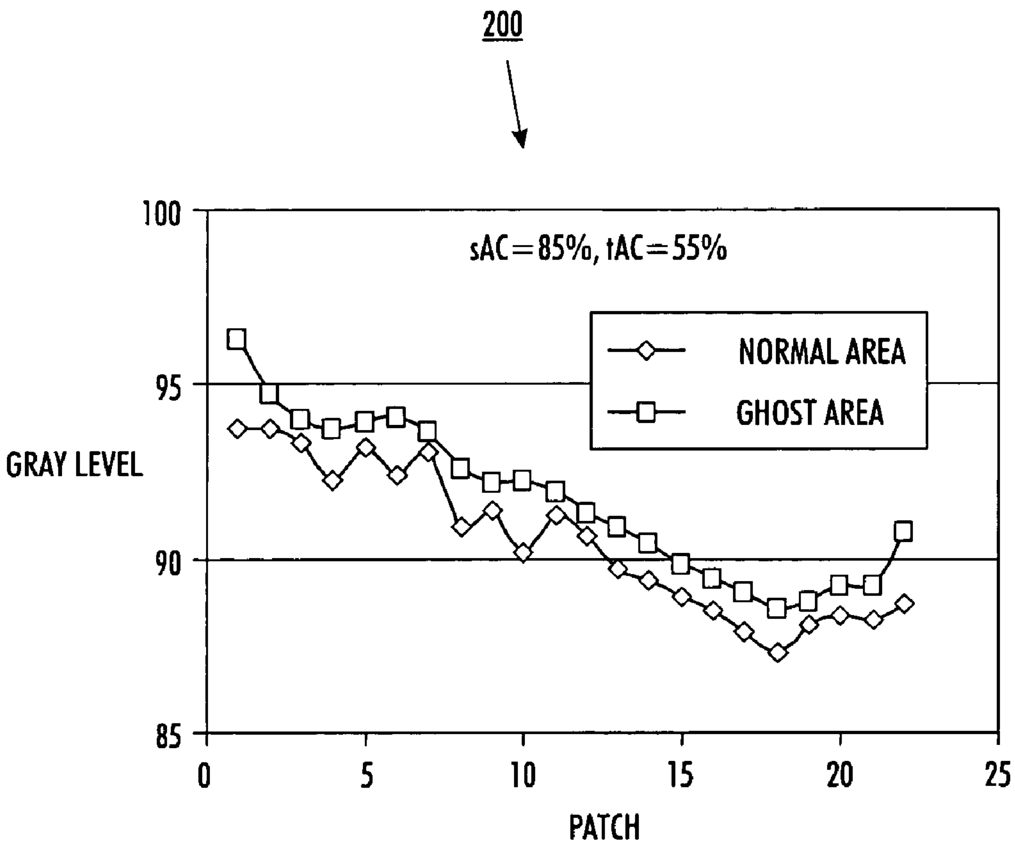
FIG. 2 is an exemplary graph depicting exemplary ghost defect measurements at exemplary area coverage settings.

FIG. 2 is an exemplary graph 200 depicting exemplary ghost defect measurements at exemplary area coverage settings. The normal area and the ghost area described in exemplary graph 200 correspond to the normal area and the ghost area described above in connection with FIG. 1. The exemplary ghost defect measurements plotted in exemplary graph 200 were taken at a source area coverage setting of 85 percent and a target area coverage setting of 55 percent. In other words, the data was acquired by sampling the exemplary test pattern 100 along the bar in the target area having a 55 percent gray level. Thus, the units on the Y-axis of exemplary graph 200 correspond to the magnitude of light reflected to the scanner from which the measurement is obtained on a scale of 0 to 255, where 0 corresponds to no reflected light or an entirely black image and 255 corresponds to the maximum of reflected light or a totally white image.

The X-axis in exemplary graph 200 corresponds to arbitrary patch numbers. The arbitrary patch numbers correspond to 25 arbitrary patches on which data was sampled from the inboard to the outboard direction. The actual curves plotted in exemplary graph 200 indicate that a variation was measured in the gray level as the scanner moved in the inboard to the outboard direction. This variation can be easily accounted for in the spatial engine response curve (ERC) correction that is applied to each pixel as described in greater detail below. However, the data compiled and graphed in exemplary graph 200 represents an aggregate average over each patch. These average data points are then used to calculate the magnitude of the ghost defect by measuring the difference between the gray level measured in the ghost area and the gray level measured in the normal area as averaged over each arbitrary patch.

It is also evident from an inspection of exemplary graph 200 that the image intensity measured in the ghost area is lighter than the image intensity measured in the normal area. Thus, the ghost defect represented by the data graphed in exemplary graph 200 is a negative ghost defect. It should be apparent that the concept illustrated by the exemplary data in exemplary graph 200 is equally applicable to a positive ghost defect.

Figure 3:
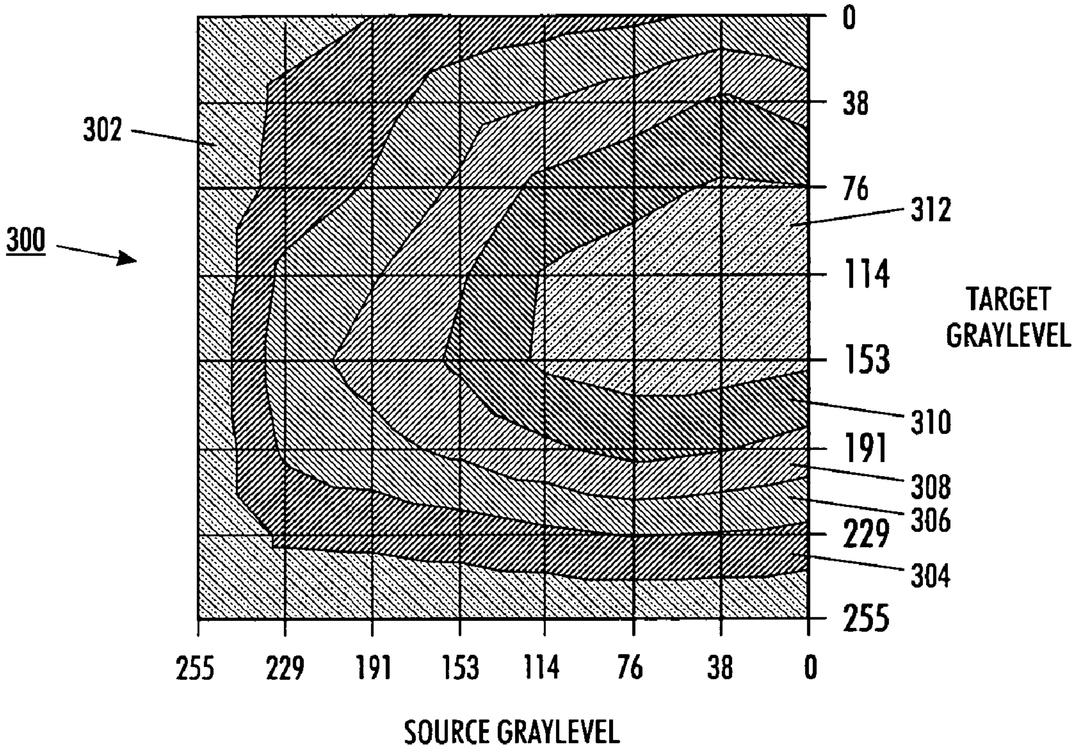
FIG. 3 is an exemplary graph depicting exemplary ghost defect measurements at exemplary gray level settings.

FIG. 3 is an exemplary graph 300 depicting exemplary ghost defect measurements at exemplary gray level settings. The X-axis in FIG. 3 corresponds to the source gray level. The Y-axis in FIG. 3 corresponds to the target gray level. While FIG. 2 plotted data curves of measurements taken at a single setting for source area coverage and target area coverage, FIG. 3 represents a plot of data gathered at all possible source gray levels with respect to all possible target gray levels.

The scales of both the X-axis and the Y-axis in FIG. 3 run from 0 to 255. These scales correspond to a standard 8-bit gray level having the same significance as the truncated scale used for the Y-axis in FIG. 2. In other words, 0 corresponds to an entirely black image having no reflected light observed by the scanner and 255 corresponds to an entirely white image reflecting the maximum possible amount of light to the scanner.

Region 302 in exemplary graph 300 corresponds to combinations of source gray level and target gray level where the magnitude of the ghost defect measured was in the range of 0 to 0.3. Region 304 corresponds to combinations of source gray level and target gray level where the magnitude of the ghost defect measured was in the range of 0.3 to 0.6. Region 306 corresponds to combinations of source gray level and target gray level where the magnitude of the ghost defect measured was in the range of 0.6 to 0.9. Region 308 corresponds to combinations of source gray level and target gray level where the magnitude of the ghost defect measured was in the range of 0.9 to 1.2. Region 310 corresponds to combinations of source gray level and target gray level where the magnitude of the ghost defect measured was in the range of 1.2 to 1.5. Region 312 corresponds to combinations of source gray level and target gray level where the magnitude of the ghost defect measured was in the range of 1.5 to 1.8.

The exemplary ghost defect data measured and plotted in exemplary graph 300 fits well to the quadratic model represented by the following equation.

$$g(s_{in},t_{in})=a_o(255-s_{in})(255-t_{in})(1+a_1(255-s_{in}))(1+a_2(255-t_{in})). \quad (1)$$

In equation (1), $s_{in}$ is the source input gray level on the scale of 0 to 255 and $t_{in}$ is the target input gray level on the same scale. The variables $a_0$, $a_1$, and $a_2$ are obtained by fitting the quadratic model to the actual measurements obtained in any given case.

Figure 4:
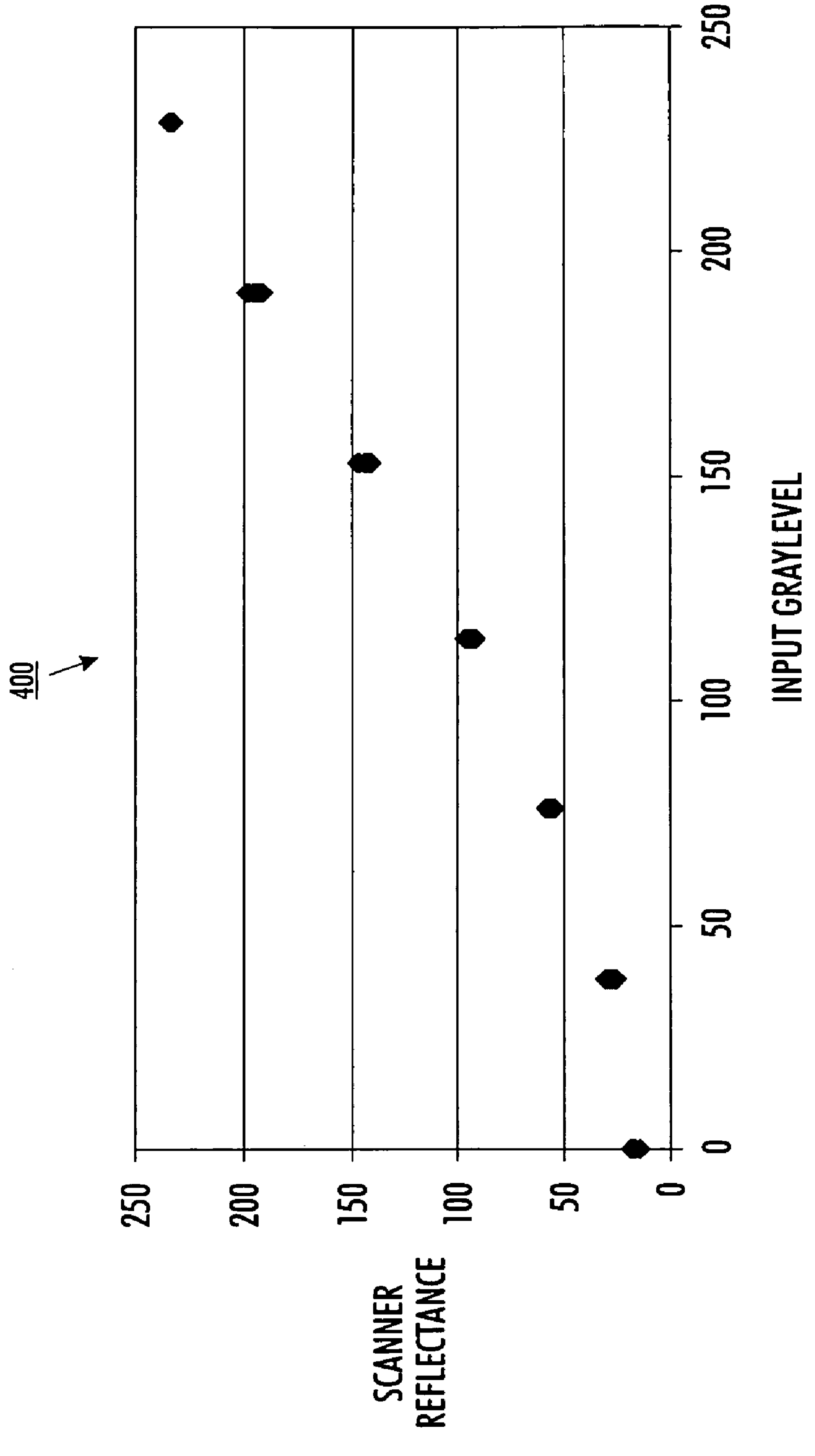
FIG. 4 is an exemplary graph depicting an exemplary continuous tone engine response curve.

FIG. 4 is an exemplary graph 400 depicting an exemplary continuous tone engine response curve. The X-axis in FIG. 4 represents the magnitude of the input gray level on the scale from 0 to 255. This 0 to 255 scale is slightly truncated in the figure. The Y-axis of exemplary graph 400 represents the scanner reflectance on a scale of 0 to 255. This scale is also slightly truncated in exemplary graph 400. The scanner reflectance of the Y-axis in exemplary graph 400 corresponds to the Y-axis described above in connection with FIG. 2 except that it depicts a more complete range of scanner reflectance in order to encompass all of the data plotted in exemplary graph 400.

In exemplary graph 400, a continuous tone engine response curve is represented by the following formula.

$$x_{out}=\mathrm{ERC}(x_{in}). \quad (2)$$

In formula (2), $x_{in}$, is the input gray level as specified in the image and $x_{out}$ is the scanner reflectance as measured by the scanner. The engine response curve is measured in various exemplary embodiments using the same test pattern as the test pattern used to obtain the ghost image. For example, in various exemplary embodiments, the engine response curve is measured using exemplary test pattern 100, or one of the variations of exemplary test pattern 100 described above in connection with FIG. 1.

Because a ghost defect can be caused by variations in the engine response curve due to an original source image one photoreceptor revolution away from a current location on the photoreceptor, the following formulas apply. First, in the normal areas $$t_{out}=\mathrm{ERC}(t_{in}). \quad (3)$$

In the ghost areas $$t_{out}^g=\mathrm{ERC}^g(t_{in},s_{in}). \quad (4)$$

where $\mathrm{ERC}^g$ is the engine response curve of the ghost and $t_{out}^g$ is the target output gray level in the ghost area. Given the definitions described above in equations (1)-(4), the ghost defect is represented by the following equation.

$$g(t_{in},s_{in})=t_{out}^g-t_{out}=\mathrm{ERC}^g(t_{in},s_{in})-\mathrm{ERC}(t_{in}). \quad (5)$$

In various exemplary embodiments, a compensation is determined for adjusting the input gray level $t_{in}$ by an amount $\Delta t_{in}$ such that the following series of equations are satisfied:

$$\begin{aligned} ERC(t_{in}) &= ERC^g(t_{in}+\Delta t_{in}, s_{in}) \\ &= g(t_{in}+\Delta t_{in}, s_{in}) + ERC(t_{in}+\Delta t_{in}) \\ &\approx g(t_{in}, s_{in}) + \frac{\partial g}{\partial t_{in}}\Delta t_{in} + ERC(t_{in}) + \frac{\partial ERC}{\partial t_{in}}\Delta t_{in}. \end{aligned} \quad (6)$$

Another way of representing the relationships represented in equation (6) is as follows:

$$\Delta t_{in} = -\frac{g(t_{in}, s_{in})}{\frac{\partial ERC}{\partial t_{in}} + \frac{\partial g}{\partial t_{in}}}. \quad (7)$$

Further simplification can be achieved because the following relationship is true:

$$\frac{\partial g}{\partial t_{in}} << \frac{\partial ERC}{\partial t_{in}}. \quad (8)$$

Equation (7) describes the simple correction that is applied in various exemplary embodiments to the continuous tone gray level value of every pixel to compensate for a ghost defect. In various exemplary embodiments, the correction represented by equations (1)-(8) is applied iteratively. In various other exemplary embodiments, the correction represented by equations (1)-(8) is not applied iteratively.

In various exemplary embodiments where compensation is applied iteratively, a simple integral control term is driven by the measured ghosting defect as the iteration proceeds. Thus, in various exemplary embodiments the following equations (9)-(12) are employed to iteratively determine the compensation factors:

$$\Delta t_{in}(0) = -\frac{g(t_{in}^*, s_{in}; 0)}{\frac{\partial ERC}{\partial t_{in}} + \frac{\partial g}{\partial t_{in}}}; \tag{9}$$

$$t_{in}(0) = t_{in}^* + \Delta t_{in}(0); \tag{10}$$

$$\Delta t_{in}(k+1) = \Delta t_{in}(k) + f(g(t_{in}(k), s_{in}; k), ERC); \text{ and} \tag{11}$$

$$t_{in}(k+1) = t_{in}^* + \Delta t_{in}(k+1). \tag{12}$$

For the case where iteration is used to further reduce the ghosting defect, exemplary equations (9) through (12) are used. Exemplary equation (9) corresponds to exemplary equation (7) rewritten to explicitly note that the terms $\Delta t_{in}(0)$, $t_{in}$*, and g($t_{in}$* ,$s_{in}$; 0) are defined at an initial time, k=0. Exemplary equation (10) shows the corrected target gray level at the initial iteration. Exemplary equation (11) shows the iteration, indexed by k. Exemplary equation (11) shows that the exemplary ghosting correction, $\Delta t_{in}(k+1)$, should be equal to the previous ghosting correction, $\Delta t_{in}(k)$, plus a further correction term, f(g($t_{in}$(k),$s_{in}$;k),ERC). The further correction term is a function of the current level of ghosting defect and the engine response curve. Exemplary equation (12) shows the desired corrected target gray level that would avoid ghosting, based on the most recent correction.

Implementation of the exemplary image compensation method described above has demonstrated that ghosting is clearly seen in the uncompensated image and ghosting is significantly reduced in magnitude in images compensated in the exemplary manner described above. This is confirmed by measurements of the difference in gray level magnitude between the target image and the ghost image. This difference is dramatically greater in the uncompensated image and the image compensated to reduce the ghost defect in the exemplary manner described above. This benefit is described in greater detail below in connection with FIG. 5.

Figure 5:
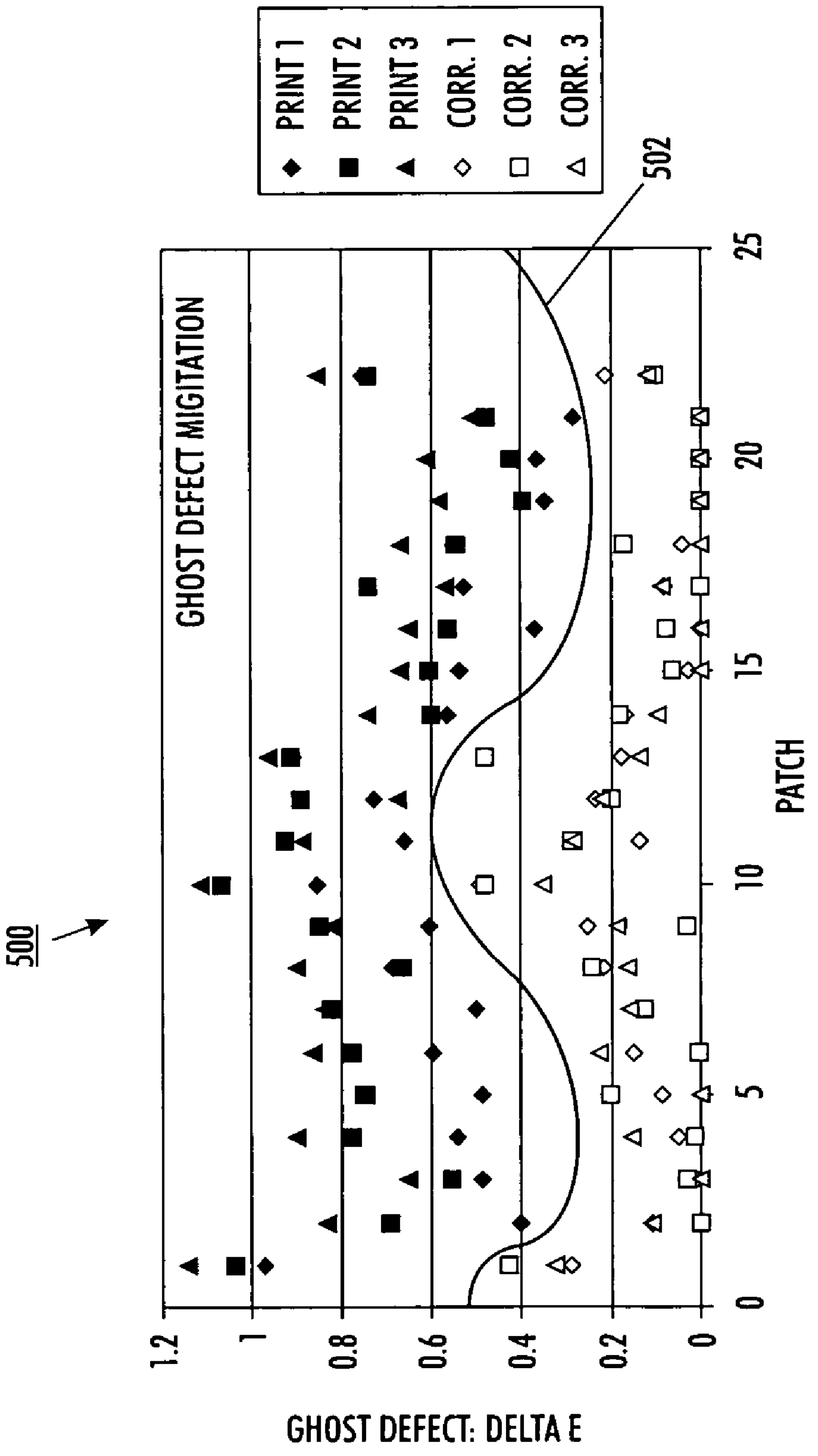
FIG. 5 is an exemplary graph depicting exemplary ghost defect measurements of exemplary compensated and uncompensated prints.

FIG. 5 is an exemplary graph 500 depicting exemplary ghost defect measurements of exemplary compensated and uncompensated prints. Data was acquired and plotted in FIG. 5 for three exemplary compensated prints. This data is plotted as the data points above curve 502 in exemplary graph 500. Data was also acquired and plotted in FIG. 5 for three exemplary uncompensated prints. This data is plotted in exemplary graph 500 below the curve 502.

A noticeable benefit exists from implementing the exemplary compensation system and method described above. This is evident from the fact that exemplary curve 502 can be drawn in exemplary graph 500 such that all of the data acquired from exemplary uncompensated prints is above the curve, and thus at a higher ghost defect level, while all of the data acquired from the exemplary compensated prints lies below exemplary curve 502, and thus at a lower level of magnitude of the ghost defect.

Figure 6:
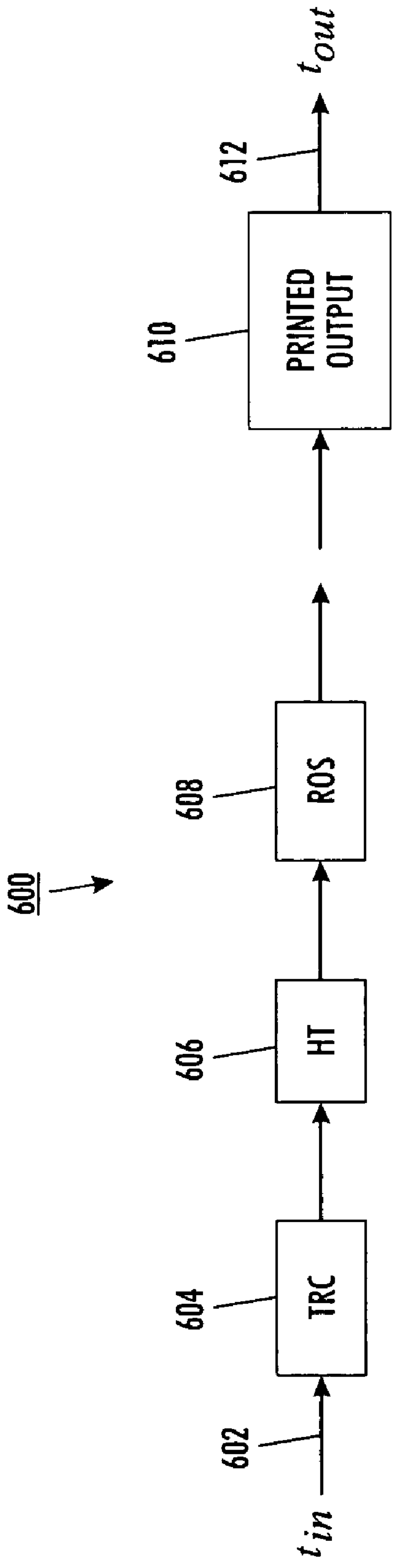
FIG. 6 is an exemplary flow chart depicting an exemplary image path.

FIG. 6 is an exemplary flow chart 600 depicting an exemplary image path. At the left of the exemplary image path in exemplary flowchart 600 the input gray level $t_{in}$ 602 is adjusted using a tone reproduction curve (TRC) mapping 604. The adjusted input gray level is then input into the halftoning (HT) 606 step in the procedure. The output of the halftoning 606 portion of the procedure is then input into a raster output scanner (ROS) 608. Next, the output of the raster output scanner 608 images the photoreceptor and produces the printed output 610. The printed output 610 has a desired output gray level $t_{out}$.

Figure 7:
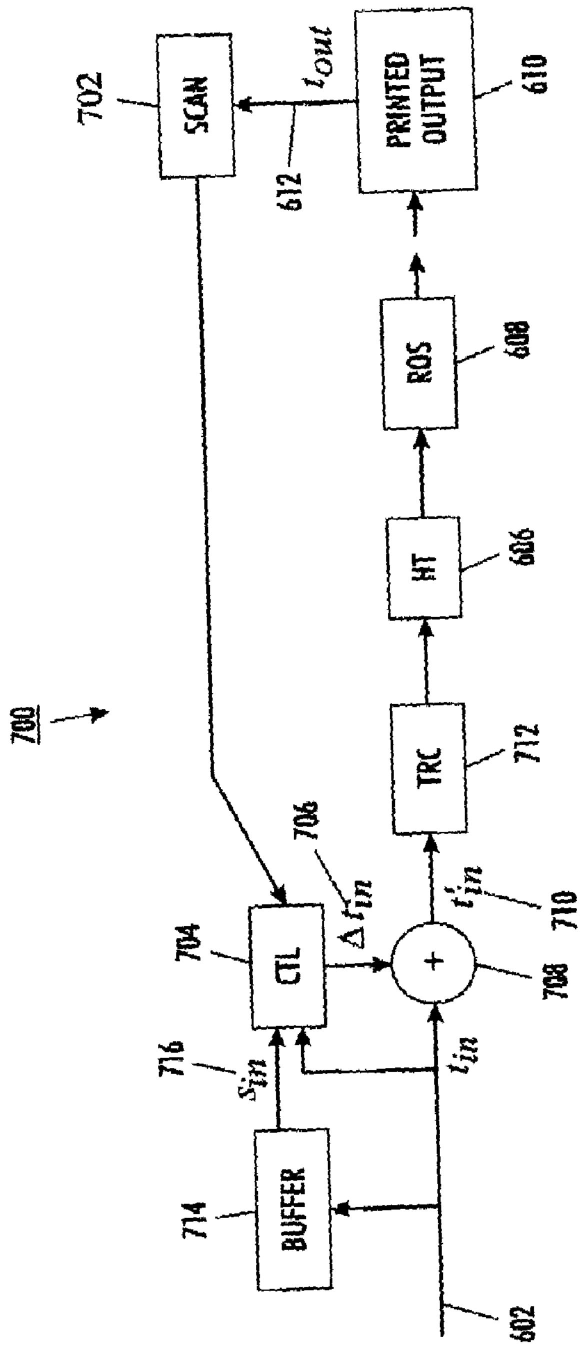
FIG. 7 is an exemplary flow chart depicting an exemplary modified image path for ghost defect compensation.

FIG. 7 is an exemplary flow chart 700 depicting an exemplary modified image path for ghost defect compensation. In exemplary flowchart 700, the steps halftone 606, raster output scanner 608, printed output 610 and output gray level $t_{out}$ 612 are the same as described above in connection with FIG. 6. Similarly, the input gray level $t_{in}$ 602 is the same as described above in connection with FIG. 6. The differences between the exemplary flowchart 700 of FIG. 7 and the exemplary flowchart 600 of FIG. 6 are as follows.

In exemplary flowchart 700, the output gray level 612 is input into scanner 702. Thus, a scanner 702 is used to obtain sample data of the output gray levels 612 evidenced in printed output 610. This data obtained by the scanner 702 is then input into a controller (CTL) 704. The controller 704 is used to calculate and determine the correction factor $\Delta t_{in}$ 706. This correction factor 706 is input into a summing block 708. The original input gray level $t_{in}$ 602 is also input into the summing block 708. The summing block 708 outputs a corrected input gray level $t'_{in}$ 710. The corrected input gray level $t'_{in}$ 710 is then input into the tone reproduction curve (TRC) module 712.

Additionally, the input gray levels $t_{in}$ 602 obtained by the system and process described above are input into a buffer 714. In various exemplary embodiments, the buffer 714 stores data from a number of scanlines at least equal to the number of scanlines in one complete photoreceptor revolution. The ghost source input gray levels $S_{in}$ 716 are then output from the buffer 714 to the controller 704. The target input gray level 602 is also input to the controller 704. Thus, the controller 704 has the benefit of the input gray level 602, the ghost source input gray level 716 and the output gray level 612 in calculating the adjustment factor 706 in the manner described above.

In various exemplary embodiments, the system and method for image-based compensation and control of a photoreceptor ghosting defect described above are implemented on a pixel-by-pixel basis. In various exemplary embodiments, the system and method of modification and control described above is implemented anywhere upstream of the tone reproduction curve 604 in the exemplary flowchart 600.

Further, in various exemplary embodiments, the output scanner 702 is implemented in line with a paper path. In various other exemplary embodiments, the output scanner 702 is implemented as a full-width array sensor embedded in the apparatus. In various exemplary embodiments, a full-width array sensor is embedded in the apparatus on the photoreceptor. In various other exemplary embodiments, a full width array sensor is embedded in the apparatus on an intermediate belt. Thus, in various exemplary embodiments, the target output gray level 612 is measured by the output scanner 702 and input into the feedback system in this manner.

Figure 8:
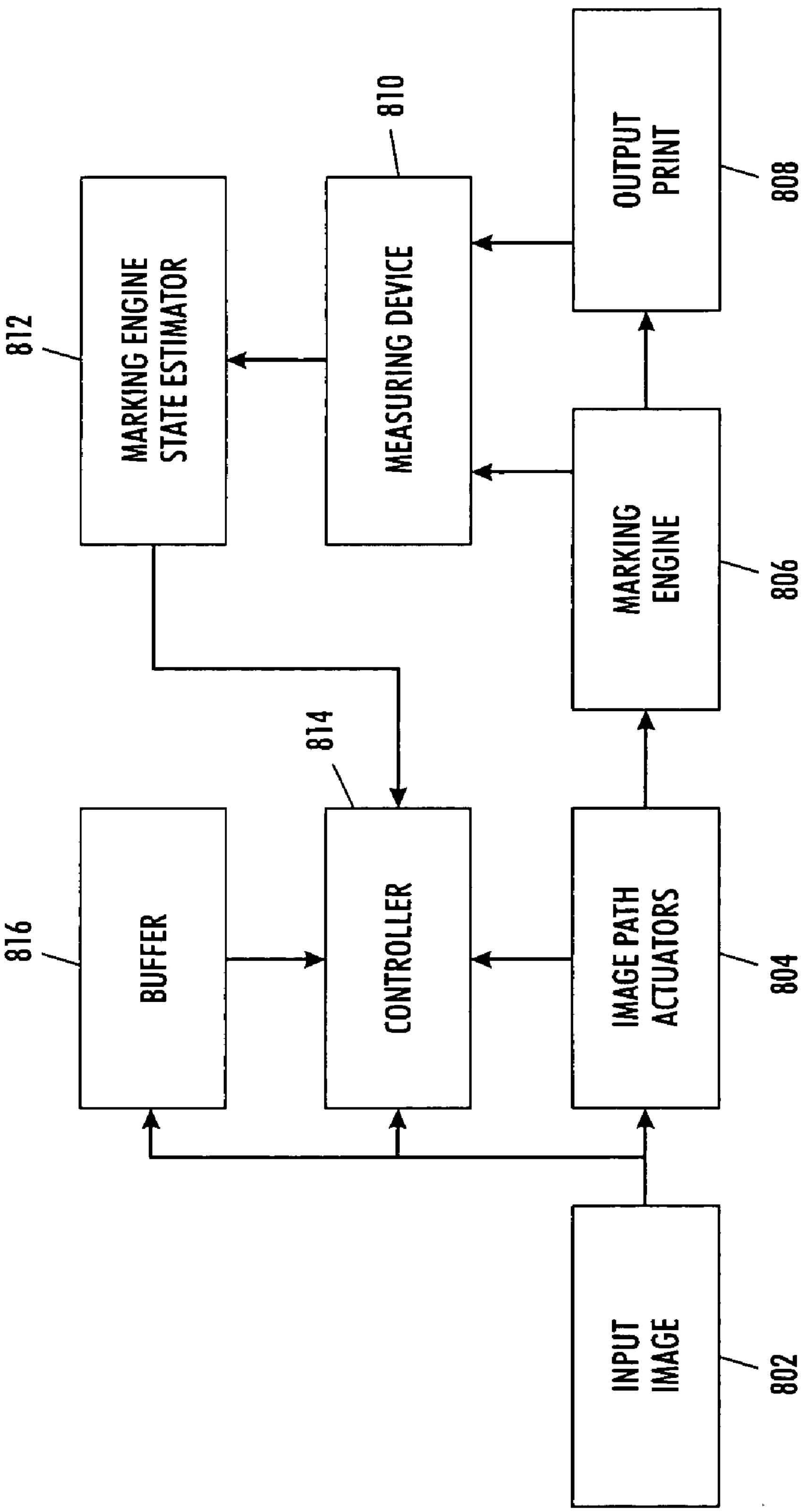
FIG. 8 is an exemplary flow chart depicting an exemplary embodiment of an image defect compensation system.

FIG. 8 is an exemplary flow chart 800 depicting an exemplary embodiment of an image defect compensation system. In exemplary flowchart 800, data from an exemplary input image 802 is obtained and input into image path actuators 804. The output from the exemplary image path actuators 804 is then input into an exemplary marking engine 806. The output of the marking engine 806 is then input to exemplary output print 808. The output of the marking engine 806 is also input into a measuring device 810 along with the output print 808.

The exemplary measuring device 810 then outputs data to exemplary marking engine state estimator 812. The output of the marking engine state estimator is then input into exemplary controller 814.

The input image data 802 is also input to exemplary buffer 816. The output from buffer 816 is input into controller 814. The output from the controller 814 is then input into the image path actuators 804.

It should be apparent that the various elements described above in connection with exemplary flowchart 800 correspond to various exemplary elements described above in connection with other exemplary figures. For example, controller 814 corresponds, in various exemplary embodiments, to controller 704. Similarly, buffer 816 corresponds, in various exemplary embodiments, to buffer 714. An example of an image path actuator 804 includes, in various exemplary embodiments, tone reproduction curve 712. Output print 808 corresponds, in various exemplary embodiments, to printed output 610. Measuring device 810 corresponds, in various exemplary embodiments, to scanner 702. Other similarities, in various exemplary embodiments, between the elements described in exemplary flowchart 800 and elements described in connection with other figures should be readily apparent.

It should be clear from the foregoing description that various exemplary embodiments include correction of an image defect that is based on an image such as a printed image. Likewise, it should be clear that, in various exemplary embodiments, an image defect is corrected as a function of not only the state of the imaging apparatus, but also as a function of previously printed images from the imaging apparatus. In various exemplary embodiments, the controller uses information about the current state of the marking engine, as well as information about images that have already been printed, in order to calculate a control action.

In various exemplary embodiments the image path actuator known as dynamic halftone thresholds is used to apply the correction factors to the images. In this actuator, the halftone thresholds are adjusted based on equations (7) and (11) to compensate for the image defect. This can result in a finer amplitude resolution in some embodiments.

Another exemplary system defect that can be corrected by employing the system and method described above is the defect known as reload. The term reload is commonly used to describe a defect that arises when a developer roll feeding the toner has trouble refreshing after a revolution at the point where toner was just delivered on the previous revolution. This reload defect results in imaging errors that, like ghost defects, are undesirable. It should be apparent that the system and process described above are implemented in various exemplary embodiments to correct for reload defect.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for correcting a defect in an image by compensating for the defect, the method comprising:

inputting a test image to an image path actuator;

inputting an output of the image path actuator to a marking engine;

creating a test output image;

measuring test data on the test output image;

inputting the test measurement data obtained from the test output image to a controller;

storing previously printed images in an image buffer;

inputting the previously printed images from the image buffer to the controller;

inputting the current image to the controller;

outputting an image correction factor from the controller based on the test measurement data, the previously printed images, and the current image to the image path actuator; and creating a corrected image based on the image correction factor output from the controller to the image path actuator, wherein the step of outputting an image correction factor includes implementing the formula $$\Delta t_{in} = -\frac{g(t_{in}, s_{in})}{\frac{\partial ERC}{\partial t_{in}} + \frac{\partial g}{\partial t_{in}}},$$

wherein $\Delta t_{in}$ is the correction factor, $t_{in}$ is an input gray level, $s_{in}$ is a ghost source input gray level, ERC is an engine response curve, and g is the magnitude of the ghost defect.

2. The method of claim 1, wherein the image defect is a ghost defect.

3. The method according to claim 1, wherein the image defect is a reload defect.

4. The method according to claim 1, further comprising the steps of inputting state data representing a state of the imaging device to the controller, and modifying the correction factor based on the state data.

5. The method according to claim 1, further comprising creating a defect model, and outputting the correction factor based on the defect model.

6. The method according to claim 5, wherein creating a defect model further includes creating a source target function that represents an entire range of a source level with respect to an entire range of a target level.

7. The method according to claim 1, wherein each step of the method is performed individually for every pixel of an image.

8. The method according to claim 1 wherein the image correction is performed at a spatial distance equal to one revolution of a photoreceptor or some multiple of revolutions of the photoreceptor from an original image.

9. The method according to claim 1, wherein the steps of the method are repeated iteratively.

10. An image defect correction system, comprising:

an image path actuator receiving a test input image from an imaging device;

a marking engine receiving information from the image path actuator and creating a test output image;

a measuring device obtaining data from the test output image;

an image buffer containing previously printed images;

a controller receiving the test measurement data from the measuring device, the image buffer, and a current image, determining a correction factor, and supplying the correction factor to the image path actuator, wherein the image path actuator receives a correction factor from the controller and the current image from the imaging device, and supplies a corrected image to the marking engine, and the correction factor is based on the formula $$\Delta t_{in} = -\frac{g(t_{in}, s_{in})}{\frac{\partial ERC}{\partial t_{in}} + \frac{\partial g}{\partial t_{in}}},$$

where $\Delta t_{in}$ is the correction factor, $t_{in}$ is an input gray level, $s_{in}$ is a ghost source input gray level, ERC is an engine response curve, and g is the magnitude of the ghost.

11. The image defect corrections system according to claim 10, wherein the defect is a ghost defect.

12. The image defect correction system according to claim 10, wherein the defect is a reload defect.

13. The image defect correction system according to claim 10, wherein the controller also receives data regarding a state of the imaging device and considers the data regarding the state of the imaging device in creating the correction factor.

14. The image defect correction system according to claim 10, wherein the controller creates a defect model that is used in obtaining the correction factor.

15. The image defect correction system according to claim 14, wherein the defect model includes a source target function that represents an entire range of a source level with respect to an entire range of a target level.

16. The image defect correction system according to claim 10, wherein the controller obtains the correction factor individually for every pixel of the image.

17. The image defect correction system according to claim 10, wherein a correction is implemented at a spatial distance equal to an integer multiple of one revolution of a photoreceptor.

18. The image defect correction system according to claim 10, wherein the controller performs an iterative correction to obtain the correction factor.

19. The image defect correction system according to claim 10, wherein the buffer contains previously printed data for at least one complete revolution of a photoreceptor.

* * * * *